United States Patent Office 3,280,136
Patented Oct. 18, 1966

3,280,136
5-SUBSTITUTED - 2,4 - OXAZOLIDINEDIONES AND MAGNESIUM CHELATE INTERMEDIATES THEREFOR
Herman Lawrence Finkbeiner, Schenectady, N.Y., assignor to General Electric Company, a corporation of New York
No Drawing. Filed May 3, 1965, Ser. No. 452,843
11 Claims. (Cl. 260—299)

This invention relates to magnesium chelates of 5-carboxy-2,4-oxazolidinediones, the method of making these magnesium chelates, and to their use in the production of 5-substituted 2,4-oxazolidinediones which can be hydrolyzed, if desired, to α-hydroxy carboxylic acids.

2,4-oxazolidinediones are well known chemical compounds. They have been extensively investigated because many of them have very useful pharmacological and herbicidal properties. These compounds have the general formula

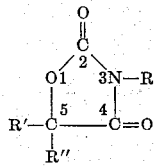

where R, R' and R" are hydrogen or hydrocarbyl, i.e., a monovalent hydrocarbon substituent. The numbers within the ring are the positions used in naming the compounds. In addition, 2,4-oxazolidinediones have been made where R is halohydrocarbyl and amino hydrocarbyl.

Although several synthetic routes can be used to prepare 2,4-oxazolidinediones, many require the preparation of intermediate compounds. Of all the methods, the simplest and most direct methods using the most readily available starting materials, involves reaction of the ester of the appropriate α-hydroxy acid with urea in the presence of sodium ethylate, or with a hydrocarbyl isocyanate, or the reaction of the amide of the appropriate α-hydroxy acid with a dialkyl carbonate in the presence of sodium ethylate. These reactions are represented by the following equations, where one or more of the hydrogens in the ester or amide can be replaced with R' or R" and vice versa.

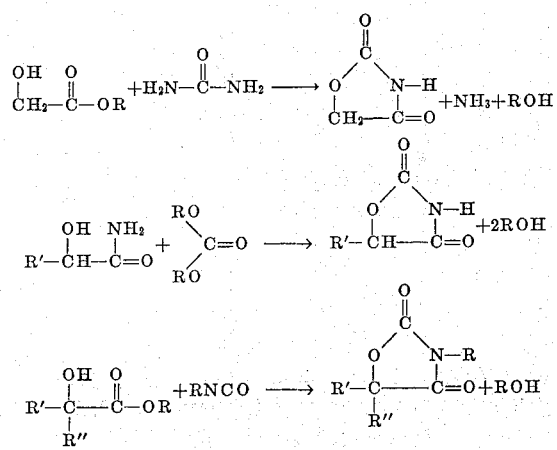

It is thus seen that the substituents in the 5-position are determined by having the appropriate α-hydroxy acid available either in the form of its ester or amide. Unfortunately, only glycolic and lactic acid are readily available at low cost. Other α-hydroxy acids generally require synthesis from ketones or aldehydes by first making the cyanohydrin followed by hydrolysis to at least the amide. Some α-hydroxy acids can be made by hydrolysis of the corresponding α-halogen carboxylic acid. Since the hydrolysis step would also remove other substituents, known α-hydroxy acids are generally limited to α-hydroxyalkyl carboxylic acids. Because of this, the known 2,4-oxazolidinediones produced from these acids, have been limited to those where the substituents are either hydrogen or hydrocarbon.

Since the hydrogen on the nitrogen of 2,4-oxazolidinediones is acidic, it readily forms metal salts which can be reacted with an alkylating agent, e.g., an alkyl halide to introduce various substituents on the 3-position. This permits substituents to be introduced on the 3-position after the 2,4-oxazolidinedione is formed. Because of this, substituents on the 3-position are not limited to having the appropriate isocyanate available. Therefore, 2,4-oxazolidinedione has been prepared which has a much wider variety of substituents on the 3-position than on the 5-position. Under special conditions, certain 3-hydrocarbon - 5 - alkyl - 5 - alkylcarbamoyl - 2,4 - oxazolidinediones have been recovered along with other products in rearrangement reactions of certain dialuric acid and barbituric acid compounds.

It would be highly desirable to be able to prepare these 3- and 5-substituted oxazolidinediones starting from readily available and low cost materials.

I have now discovered that the carbon atom in the 5-position of 2,4-oxazolidinediones, if it has two hydrogens on it, i.e., it is a methylene (—CH$_2$—) group, can be activated so that it will react with a wide variety of alkylating agents with which it would not react if not so activated, to produce a wide variety of 5-substituted-2,6-oxazolidinediones easily and inexpensively. I have found that this carbon atom in the 5-position of 2,4-oxazolidinediones is activated by reacting the 2,4-oxazolidinedione with a magnesium alkyl carbonate. The magnesium alkyl carbonate carboxylates the 5-position and forms a metal complex of the corresponding 5-carboxy-2,4-oxazolidinedione. These magnesium complexes of the 5-carboxy-2,4-oxazolidinediones readily react with acids, preferably mineral acids, to form the free acid, i.e., 5-carboxy-2,4-oxazolidinediones, with alcohols in the presence of mineral acids or with dialkyl pyrocarbonates to form esters, i.e., 5-alkyl-oxycarbonyl-2,4-oxazolidinediones and with hydrocarbyl isocyanates, i.e., alkyl, cycloalkyl, aralkyl, aryl, alkaryl, etc., isocyanates to form amides, i.e., 5 - hydrocarbylcarbamoyl - 2,4 - oxazolidinediones. These acids, esters and amides, are new chemical compounds which can not be produced by the prior art processes. These magnesium complexes of the 5-carboxy-2,4-oxazolidinediones also readily react with alkylating agents; for example, alkyl halides, alkylene dihalides, aralkyl halides, acyl halides, acyl anhydrides, Mannich bases, etc., to form 5-substituted-2,4-oxazolidinediones. Since 2,4-oxazolidinediones having two hydrogens on the carbon atom in the 5-position can be easily made from the readily available glycolic acid, my method provides a new and facile method for the production of a wide variety of 2,4-oxazolidinediones from a single source material.

If the nitrogen in the 3-position of the 2,4-oxazolidinedione has a hydrogen atom attached to it, i.e., there is no organic substituent on it, this —NH group is acidic and will react with bases to form salts. If one reacts such a 2,4-oxazolidinedione with the magnesium alkyl carbonates, then 2 moles of the magnesium alkyl carbonate must be used for each mole of 2,4-oxazolidinedione, since 1 mole will react with the 3-position to form the corresponding magnesium salt. To avoid using this extra mole of the magnesium alkyl carbonate, the 2,4-oxazolidinedione can first be reacted with a base, for example, an alkali metal hydroxide, an alkali metal alkoxide, etc., to form the corresponding alkali metal salt with the acidic group in the 3-position. Now only 1 mole of the metal alkyl carbonate is required to form the metal complex of the 5-carboxy-2,4-oxazolidinedione as is also the case when the 3-position is substituted with an organic group.

Furthermore, if the 2,4-oxazolidinedione is unsubstituted in the 3-position with an organic group, the alkylating agent, if it is an alkyl halide, will react with the metal salt and will alkylate the 3-position at least as readily as the 5-position of the 2,4-oxazolidinedione. It is therefore necessary to use two equivalents of the alkylating agent to insure complete alkylation of the 5-position for those 2,4-oxazolidinediones which are not substituted in the 3-position with an organic group, whereas only one equivalent of alkylating agent needs to be used if the 3-position of the 2,4-oxazolidinedione is already susbtituted.

Since 3-substituted-2,4 - oxazolidinediones are readily available or can be prepared either by the reaction of an alkyl or aryl isocyanate and glycolic acid or by the alklation of 2,4-oxazolidinedione itself, I prefer to form the magnesium complex of the 2,4-oxazolidinedione by using a 2,4-oxazolidinedione which is already substituted in the 3-position. These reactions can be illustrated best by the following equations:

(I) Formation of magnesium complexes of a 5-carboxy-2,4-oxazolidinedione:

(a) R is a monovalent organic group, R' is the alkyl moiety in the magnesium alkyl carbonate,

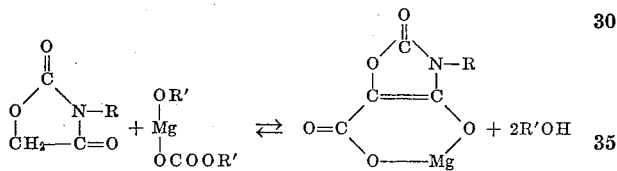

Removal of the R'OH causes the reaction to go to completion to the right, i.e., by distillation.

(b) When R is hydrogen, M' is an alkali metal, R' is the alkyl moiety of an alcohol,

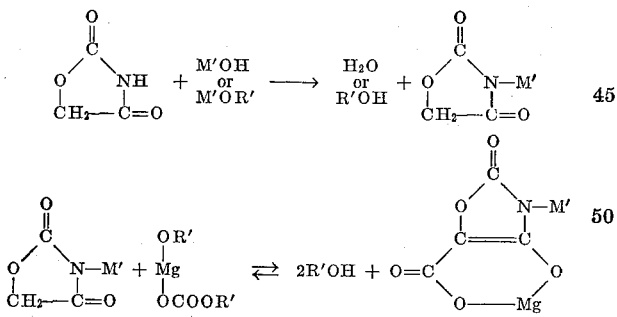

Removal of the R'OH causes the reaction to go to completion to the right. If the 2,4-oxazolidinedione is not converted to an alkali metal salt in the first equation of (b), then 2 moles of the magnesium alkyl carbonate are required in the second equation of (b) with the magnesium of the magnesium alkyl carbonate forming a salt with the 3-position of the complex, i.e.,

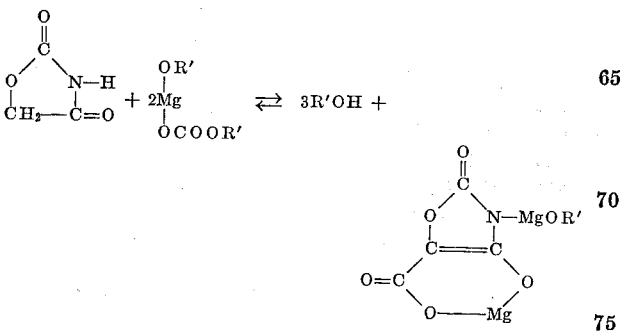

(II) Acidification (HCl used as typical of acid)
(a) R=H (neutralized as in I (b).

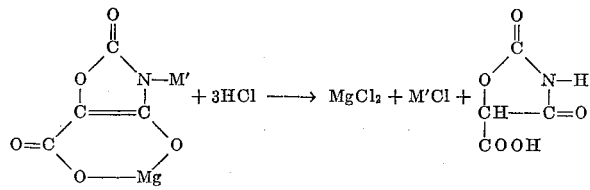

(b) R is monovalent organic radical,

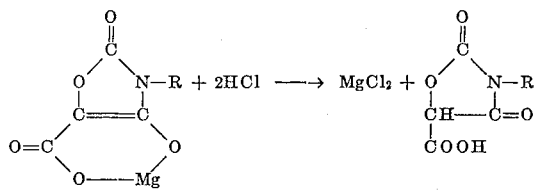

(III) Esterification R' is aliphatic or aryl substituted aliphatic, R=H (neutralized as in I(a)).

(a) With alcohol in presence of an acid (HCl typical),

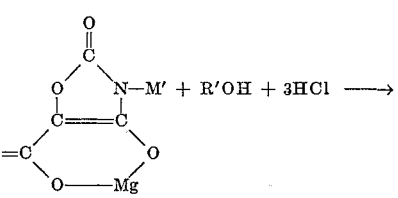

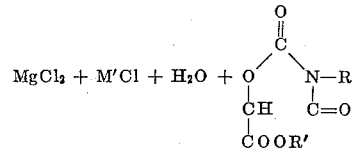

(b) With a dialkyl pyrocarbonate, R is monovalent organic radical, R' is monovalent aliphatic or aryl substituted aliphatic,

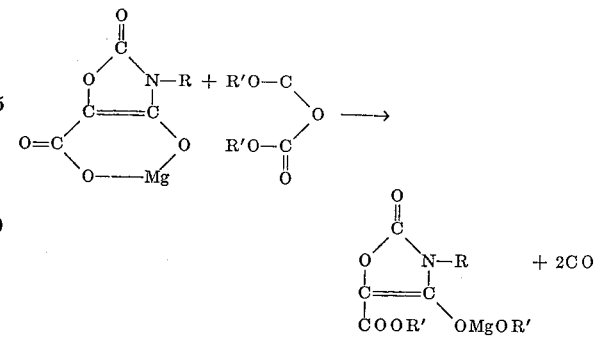

Acidification leads to the free ester (HCl typical acid),

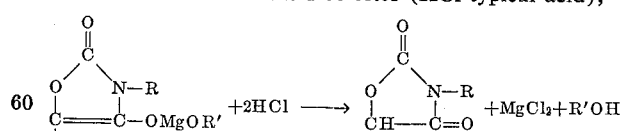

(IV) Amidization with isocyanates, R" is hydrocarbyl, R is monovalent organic or H (converted to alkali metal salt), HCl typical acid,

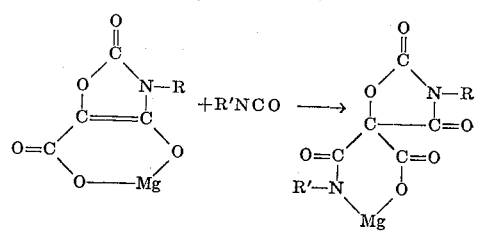

The above proposed intermediate is not isolated but on acidification produces the amide,

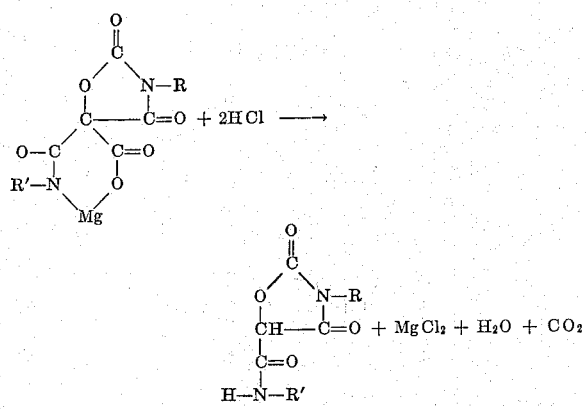

(V) Alkylation reactions with haloaliphatic compounds (X is chlorine, bromine or iodine),
  (a) R and R'' are each a monovalent organic group,

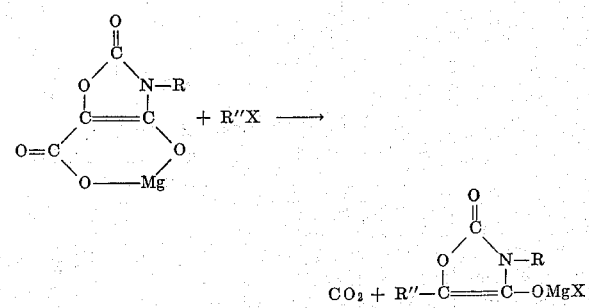

(b) R is hydrogen, R'' is the same as for V(a), the 2,4-oxazolidinedione is first converted to alkali salt,

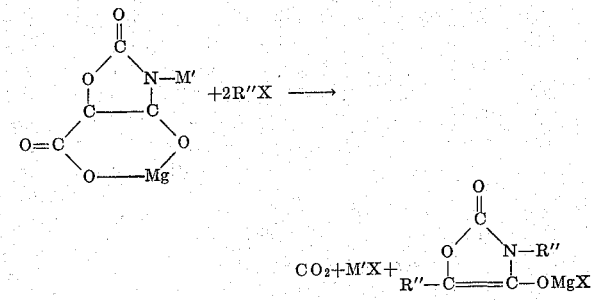

(VI) Alkylating reactions with dihaloaliphatic compounds (X as in V),
  (a) R is a monovalent organic group, R''' is a divalent organic group and 1 mole (2 equivalents) of alkylating agent are used per mole of 2,4-oxazolidinedione complex,

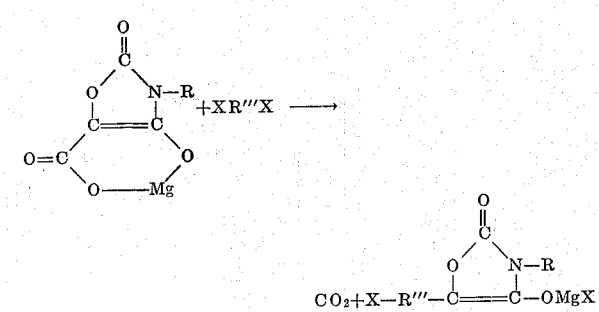

(b) Same as (a) but 2 moles of 2,4-oxazolidinedione complex are used per mole of alkylating agent.

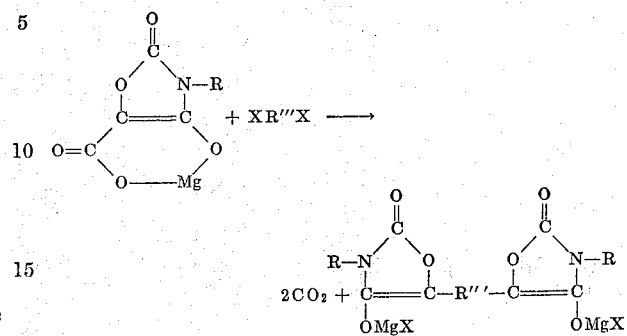

After the alkylating reaction, the metal salts of the 2,4-oxazolidinediones formed in the above reactions are coverted to the corresponding 2,4-oxazolidinediones by reaction with an aqueous acid solution. This acid should be one which will form a water-soluble salt with the metal so that it can be washed from the alkylated 2,4-oxazolidinedione product. Hydrochloric acid is the cheapest and most convenient acid but other mineral acids or water-soluble carboxylic acids, e.g., acetic acid, propionic acid, etc., may be used providing they do not form insoluble magnesium salts. This reaction converts the

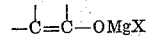

grouping in the above products to the

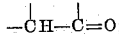

grouping. However, if the 2,4-oxazolidinediones are to be hydrolyzed to α-hydroxy carboxylic acids, the metal salts may be hydrolyzed to metal salts of the hydroxy acid followed by removal of the metal ion by well known techniques, e.g., ion exchange with the ion exchange resin in the hydrogen form, precipitation of the metal as an insoluble salt, etc., to produce the free hydroxy acid.

(VII) Hydrolysis of these 2,4-oxazolidinediones with an alkali leads to two general types of hydroxy acids according to the following general equations:
  (a) R, R' and R'' are each a monovalent organic group,

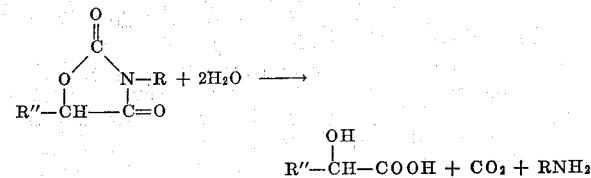

(b) R''' is a divalent organic group,

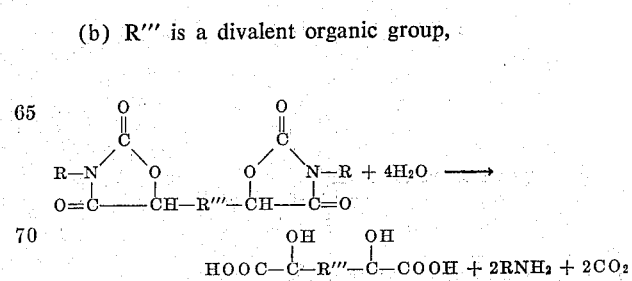

(VIII) Alkylating and hydrolysis reactions with Mannich bases,

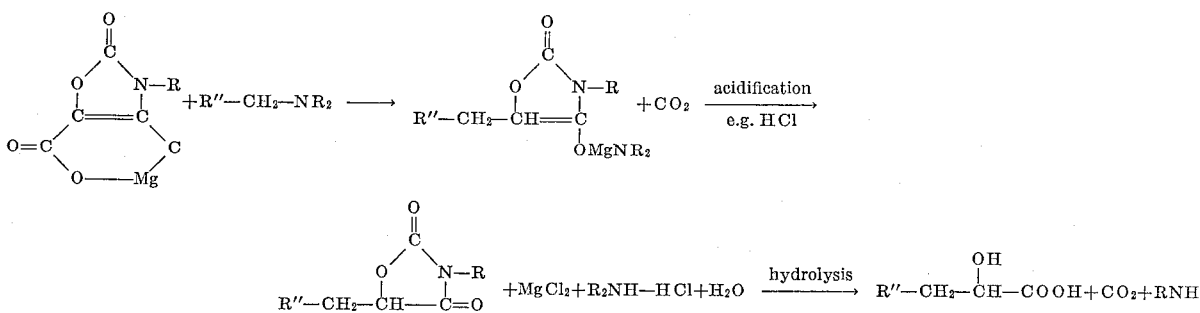

(IX) Alkylating and hydrolysis reactions with acyl halides,

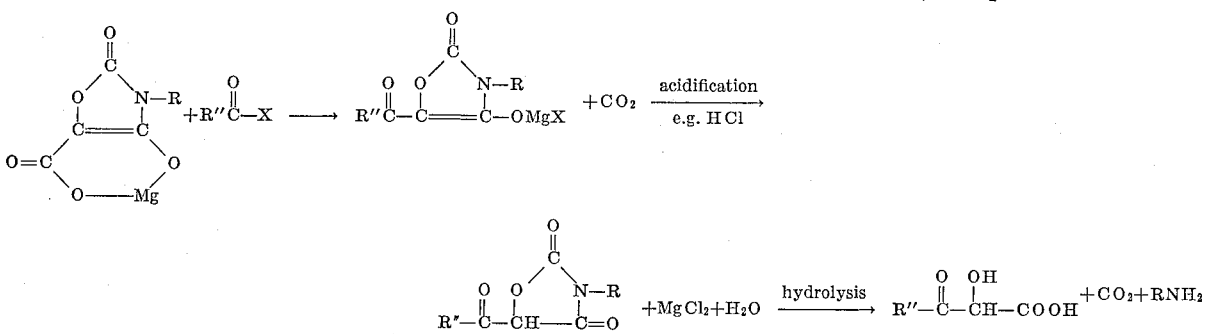

From the above discussion and equations, the following observations can be made:

Equations II(a), (b), III(a), (b), and IV illustrate the preparation of 2,4-oxazolidinediones whose 5-position is substituted by a carboxly, ester or amide group. If it is desired that the 3-position be substituted, such a substituent is either introduced by using the appropriate isocyanate in making the starting 2,4-oxazolidinedione or by alkylating the 3-position with the appropriate alkylating agent prior to making the magnesium complex. This is necessary since, as stated previously, and as illustrated by Equation V(b), alkylation of the magnesium complex will alkylate both the 3- and 5-positions. Only the 3-position is alkylated if the alkylation reaction is carried out prior to making the magnesium complex.

As Equations II and III show, acidification of the magnesium complex leads to the production of the free carboxyl group in the 5-position. If an alcohol is also present during acidification, the corresponding ester is obtained. Esters are also obtained by reaction of the magnesium complex with pyrocarbonates as shown by Equation III(b). Any acid more acidic than the carboxyl group may be used. Preferably, a strong acid, for example, a mineral acid is used. This is because the reactions, especially the esterification reaction, proceeds with less production of by-products and at a more rapid rate with such acids. Furthermore, such acids can be used in aqueous solutions in which the magnesium salt dissolves but in which the 2,4-oxazolidinedione is insoluble, thus simplifying the separation of the reaction products.

Any available alcohol or pyrocarbonate ester may be used to produce the ester derivatives. Likewise, any available isocyanate can be used to produce the amide derivatives. As will be readily apparent, the use of a polyhydric alcohol, for example glycerol, ethylene glycol, etc., or a polyisocyanate, for example, butylene diisocyanate, p-phenylene diisocyanate, etc., may be used in the same way as illustrated in Equation VI(a) and (b).

Equations I(b), V(b) and VII(a) show that, in general, the nitrogen atom in the 3-position of the 2,4-oxazolidinediones does not appear in the molecule of the hydroxy acid product, but is in the nitrogen of the amine formed as a by-product in the hydrolysis reaction. It is desirable, when using my reaction to prepare α-hydroxy acids as the final product, that R, since it will be the organic residue of the amine by-product, generally should be a relatively cheap substituent to introduce into the 3-position. Because of this, it is preferred that R be a lower alkyl group, i.e., an alkyl group having from 1 to 10 carbon atoms, for example, methyl, ethyl, propyl, butyl, pentyl, hexyl, cyclohexyl, heptyl, octyl, nonyl, decyl, including the various isomers of such alkyl groups, for example, isobutyl, secondary butyl, 2,4-dimethylhexyl, isooctyl, etc., a lower alkyl group substituted with a phenyl or naphthyl group, wherein the phenyl or napthyl group may also be substituted by one or more lower alkyl groups, i.e., an aralkyl group, for example, benzyl, phenylethyl, methylbenzyl dimethylbenzyl, ethylbenzyl, naphthylmethyl, etc., or an aryl group, for example, phenyl, naphthyl, tolyl, xylyl, ethylphenyl, etc. However, if cost is no object, or if 2,6-oxazolidinediones are the desired final product, it is readily apparent that R can be an alkyl or aryl group having more than 10 carbon atoms, e.g., up to 30 carbon atoms, and may be substituted with any desired substituent depending on the desired final product, without interfering with the reaction or with the production of either the desired 2,4-oxazolidinedione or the desired α-hydroxy acid.

As stated previously, 3-substituted 2,4-oxazolidinediones can be made either directly from an isocyanate and glycolic acid or by direct alkylation of a 2,6-oxazolidinedione. For this reason, if these means provide the desired substituent in the 3-position of the 2,4-oxazolidinedione, I prefer to start with such 3-substituted 2,4-oxazolidinedione in making the metal complex, since it simplifies the reaction and leads to a more straightforward production of the 5-substituted 2,4-oxazolinediones. Any of the alkylating agents capable of displacing the acidic hydrogen in the 3-position, i.e., alkyl halides, alkylene dihalides, alkene halides, Mannich bases, etc. may be used. Such compounds are more fully disclosed with regards to agents for alkylating the 5-position.

As will be readily apparent to those skilled in the art, if it is desired to carry out the alkylation reaction illustrated in Equation VI(a), it is preferable to add the metal complex of the 2,4-oxazolidinedione to the alkylating agent in order to increase the yield of the desired product, and to suppress any of the reaction shown in Equation VI(b). This is because, if the alkylating agent is added to the metal complex of the 2,4-oxazolidinedione, then at the start of the reaction, the metal complex will be temporarily in excess and cause some of the reaction shown in Equation VI(b). In carrying out the reaction to obtain the product shown in Equation VI(b), it does not matter if a product such as shown in Equation VI(a) is an intermediate in the reaction, since the product shown in Equation VI(a) is capable of further reaction with the metal complex of the 2,4-oxazolidinedione to form the product shown in Equation VI(b).

It is also evident from the above discussion and general equations that the actual substituents of R' and R" are completely dependent upon the desired 5-substituted-2,4-oxazolidinedione or α-hydroxy acid to be obtained. In the above general equations which are representative of the reactions, when an alkyl halide or an alkylene dihalide is used as the alkylating agent, where X then is chlorine, bromine, or iodine, R" or R''' may be any alkylene or alkyl group having from 1 to 20 carbon atoms, for example, from methyl to eicosyl, i.e., methyl, ethyl, propyl, butyl, octyl, dodecyl, hexadecyl, etc., including isomers of said alkyl groups, e.g., isopropyl, t-butyl, 2-methyl-4-ethyloctyl, etc., and methylene to eicosylene, inclusive, i.e., the group may be the divalent groups corresponding to the above alkyl groups. They may contain aryl, haloaryl, etc., substituents, for example, R" can be benzyl, chlorobenzyl, bromobenzyl, iodobenzyl, dichlorobenzyl, methylbenzyl, trimethylbenzyl, ethylbenzyl, phenylethyl, chlorophenylethyl, naphthylmethyl, bromonaphthylmethyl, etc., and R''' can be arylylene, for example, xylylene (phenylenedimethylene), phenylenediethylene, naphthyldimethylene, chlorophenylenedimethylene, etc.

Where an alkylation reaction such as illustrated in Equation VI(a) is carried out, the residual halogen on the aliphatic carbon atom of R''' may be further reacted, for example, with ammonia, to produce an amino group which can further be reacted with ammonium cyanate to produce the ureido group, hydrolyzed with water to introduce a hydroxyl group, reacted with an alkaline solution of hydrogen sulfide to produce a sulfhydryl group, etc. Alkyl halides and alkylene dihalides, including aralkyl halides, aralkylene dihalides and arylenedi-(alkyl halide), are therefore convenient alkylating agents to use when it is desired to produce 2,4-oxazolidinedione where the substiuent on the 5-position (or α-hydroxy acids wherein the organic residue attached to the α-carbon atom, other than the hydroxyl and the carboxyl group) is alkyl, haloalkyl, aralkyl, haloaralkyl, alkylene, aralkylene, arylenedialkylene, haloaryldialkylene, haloalkylaralkyl, haloalkylhaloaralkyl, etc. In addition, alkene and alkenyl halides, e.g., allyl halides, propargyl halides, etc., may be used to introduce unsaturated substituents on the 5-position of the 2,4-oxazolidinedione which can be hydrolyzed to produce unsautrated α-hydroxy acids.

Mannich bases of heterocyclic compounds and halomethylated heterocyclic compounds (which can be considered as heterocyclic-substituted methyl halides) are desirable alkylating agents when the desired substituent in the 5-position of the 2,4-oxazolidinedione or the residue attached to the α-carbon atom of the α-hydroxy acid is a heterocyclic group. Heterocyclic compounds having an active hydrogen atom will readily react with formaldehyde and a hydrogen halide to form the halomethyl derivative, whereas Mannich bases of heterocyclic compounds are well known compounds and are the reaction product of a heterocyclic compound having a reactive hydrogen on the ring, formaldehyde and a secondary amine. Since the secondary amine moiety of the Mannich base is split off as a by-product in the alkylation reaction, it preferably is a cheap amine, for example, a di- (lower alkyl) amine, e.g., dimethyl amine, etc.

Acidic groups present as substituents on the alkylating agent reduce the yield of α-hydroxy acid product since they cause some decarboxylation of the metal complex of the 5-carboxy 2,4-oxazolidinedione. Alcoholic hydroxyl groups are somewhat acidic. Phenolic hydroxyl groups are more acidic than alcoholic hydroxyl groups, while the carboxylic acid hydroxyl group is the most strongly acidic. Therefore, alcoholic hydroxyl groups cause the least decrease in yield because of decarboxylation while carboxylic hydroxyl groups cause the greatest decrease in yield. To obtain the maximum yield of product, it is desirable to inactivate these hydroxyl groups. This can easily be done by converting the alcoholic and phenolic hydroxyl groups to ethers. Phenolic and carboxylic hydroxyl groups can be converted to alkali metal salts. Both of these derivatives can then be converted back to the corresponding hydroxyl groups after the alkylation step which itself causes decarboxylation of the metal complex of the 5-carboxy 2,4-oxazolidinedione or after the hydrolysis of the 2,4-oxazolidinedione leading to the α-hydroxy acid. By use of this technique the alkylating agents named above may be used which have hydroxyl and carboxyl groups on the alkyl or aryl nucleus.

In forming the magnesium alkyl carbonate, either the metal, in elemental form, is reacted directly with an alcohol or the metal in the form of a salt is reacted with an alkali metal alkoxide. In the latter case, the alkali metal reacts with the anion of the initial salt and precipitates from the solution and can be removed by filtration, if desired, or left in the reaction mixture. In either case, the product is a magnesium alkoxide. These magnesium alkoxides readily react with carbon dioxide to form the corresponding magnesium alkyl carbonate in which the alkyl group is the alkyl residue of the alcohol used. As Equation I(a) shows, the magnesium alkyl carbonates react with the 2,4-oxazoldinedione with the alkyl moiety of the magnesium alkyl carbonate being converted to the alcohol from which the magnesium alkoxide was originally made. Since the alkyl group of the magnesium alkyl carbonate does not appear in the final product, the choice of the alcohol to be used in forming the magnesium alkyl carbonate is based purely on economics and ease of use. For this reason, the lower alkyl alcohols, for example, methyl, ethyl, propyl, isopropyl, butyl, isobutyl, etc., alcohols, are generally used. The preferred alcohol is methyl alcohol, since it is more acidic than the other lower alkyl alcohols and more readily reacts with the magnesium to form the metal alkoxide.

Although more than one mole of carbon dioxide can be reacted with one mole of the metal alkoxide, see Finkbeiner and Stiles, J. Am. Chem. Soc. 85, 616–622 (1963), such a reaction requires that a partial pressure of carbon dioxide be maintained over the solution at all times. As soon as the partial pressure of the carbon dioxide is reduced below this level, the excess carbon dioxide is slowly expelled so that in a normal atmosphere of air, the stable product of the magnesium alkoxides is the reaction product of one mole of carbon dioxide with one mole of the metal alkoxide. Such a product is stable even in a nitrogen atmosphere. No benefit would be gained in using the magnesium alkyl carbonates formed with two moles of carbon dioxide to one mole of the metal alkoxide, since the excess carbon dioxide over the mole-to-mole compound would have to be expelled before the formation of the metal complex of the 5-carboxy 2,4-oxazolidinedione proceeds. The excess carbon dioxide over the ratio of one mole of carbon dioxide to one mole of the metal alkoxide has therefore served no useful purpose. However, it is to be understood that the magnesium alkyl carbonates having this excess carbon dioxide may be used in the practice of my invention in the manner described above.

The magnesium alkyl carbonates will react with all 2,4-oxazolidinedione containing a —CH₂— group in the 5-position, i.e., 2,4-oxazolidinedione itself, and 3-substituted 2,4-oxazolidinediones, to form the corresponding metal complex of the corresponding 5-carboxy 2,4-oxazolidinedione. This reaction is carried out in solution using a solvent which will dissolve the 2,4-oxazolidinedione as well as the metal complex obtained as the product. Hydroxylic solvents such as alcohols tend to be reactive with the magnesium complex and therefore interfere with the obtaining of optimum yields in the same way as pointed out above with regard to the hydroxyl groups present in the alkylating agent. I therefore prefer to use non-reactive solvents, for example, dimethyl formamide, tetrahydrofuran, dimethyl sulfoxide, etc. Such solvents can be diluted with a non-solvent for the 2,4-oxazolidinedione and magnesium complex, for example, hydrocarbons such as benzene, toluene, xylene, etc., as long as the amount used does not cause insolubility of either the 2,4-oxazolidinedione or magnesium complex in the mixture. Since the magnesium alkoxide is formed in alcoholic solution, the excess alcohol is preferably removed before the magnesium alkyl carbonate formed from the alkoxide is added to the reaction mixture. This is because the reaction of 2,4-oxazolidinediones with the magnesium alkyl complex is an equilibrium reaction producing an alcohol which should be removed from the reaction mixture to produce the maximum yield of the magnesium complex of the 5-carboxy-2,4-oxazolidinediones. This can easily be done by applying reduced pressure at from ambient temperature up to about 50° C., to remove the bulk of the alcohol but higher temperatures should be avoided at this stage since otherwise the magnesium alkoxide is apparently rendered inactive by such treatment. The final traces of the alcohol are not removed until after adding the same type of solvent as is to be used to dissolve the 2,4-oxazolidinedione. This should be so chosen that it has a higher boiling point than the alcohol to be distilled. Conveniently, at this point, carbon dioxide can be bubbled into the mixture since the magnesium alkyl carbonate is more soluble than the magnesium alkoxide. After saturating the solution with carbon dioxide, the solution is heated above the boiling point of the alcohol, using reduced pressure if desired, although atmospheric pressure can be used, until the last trace of the alcohol is removed. A carbon dioxide atmosphere is maintained during both the distillation and cooling period to assure maximum yield of the magnesium alkyl carbonate. Any excess carbon dioxide is removed from the alkylation reaction mixture by sweeping the reaction vessel with dry air or nitrogen. This can be done after the 2,4-oxazolidinedione is added.

The actual quantity of magnesium alkyl carbonate in the solution prepared as described above is readily determined by adding a known volume of the solution to excess standard sulfuric acid, heating the solution to dispel carbon dioxide and back-titrating with standard sodium hydroxide. The magnesium alkyl carbonate prepared as described above is an extremely stable solution and may be kept in stoppered bottles with no detectable change in its reactivity or titre.

The 2,4-oxazolidinedione, which is to be complexed with the magnesium alkyl carbonate, can be dissolved in the solution of the magnesium alkyl carbonate or it can be separately dissolved in another portion of the solvent, and the solution added to the magnesium alkyl carbonate. As the above equations indicate, at least one mole of the magnesium alkyl carbonate should be added for each mole of 2,4-oxazolidinedione since the complex is formed in the proportion of 1 mole of the magnesium alkyl carbonate to 1 mole of the 2,4-oxazolidinedione.

Since the alkylation of the magnesium complex of a 2,4-oxazolidinedione is also carried out in solution, there is no necessity for isolating the magnesium complex of the 2,4-oxazolidinedione since the solvents used for the making of the magnesium complex are admirably suited for carrying out the alkylation reaction. The solutions of the magnesium complexes can be stored and used as desired. However, it should be kept in mind that they are very reactive compounds, reacting even with the water vapor in air. Therefore, it is preferable that they be stored in tightly stoppered bottles if they are not used immediately.

As was pointed out above, the alkylating agent used to alkylate the 5-position and the 3-position, if desired, of the 2,4-oxazolidinedione is chosen on the basis of the particular 2,4-oxazolidinedione it is desired to produce. If it is desired to use the 2,4-oxazolidinediones produced by my process as starting materials to produce α-hydroxy acids, then only the alkylating agent used to alkylate the 5-position is critical since it is this substituent which determines the substituent on the α-carbon atom other than the hydroxyl and carboxyl group of the desired α-hydroxy acid.

In order that those skilled in the art may readily understand how the above reactions are carried out, the following examples which are illustrative of the practice of my invention are given by way of illustration only and are not for purposes of limitation. All percentages are by weight unless specifically stated.

*Example 1*

This example illustrates the preparation of the magnesium alkyl carbonates. Magnesium methyl carbonate is readily prepared by the following procedure: 8 liters of anhydrous methanol are placed in a 12-liter flask equipped with a reflux condenser, stirrer and gas inlet. A few grams of magnesium are added and after the reaction is initiated a total of 480 grams of magnesium turnings are added at a rate to maintain a constant but controlled reflux of the methanol. After the magnesium is completely reacted, the excess methanol is stripped off under the vacuum of a water aspirator. A 50° C. water bath is used to heat the mixture and stirring is continued as long as possible to aid in removing the methanol. To aid in the redissolution of the magnesium methoxide, it is desirable to leave some methanol in the solid mass obtained. Therefore, when the pressure in the system can no longer be decreased (approximately 20 mm.), enough dimethyl formamide is added to the flask to give a total volume of 10 liters. Carbon dioxide is admitted through the gas inlet to the stirred reaction mixture as rapidly as it can be absorbed. A bubble counter is used at the outlet of the system to maintain a positive pressure of carbon dioxide.

After all the solid magnesium methoxide is dissolved a short bubble-cap fractionating column is substituted for the reflux condenser and the temperature is raised gradually to distill any remaining methanol. The reaction mixture is stirred, still maintaining a slow stream of carbon dioxide during the distillation which is stopped when the temperature at the head of the column is approximately 150° C. The mixture is cooled to room temperature under carbon dioxide to assure saturation.

The magnesium methyl carbonate solution prepared in this fashion is stable and can be used over a period of 7 months with no detectable change in its effectiveness. The molarity of the solution with respect to magnesium is about 2 M. The exact concentration is determined by adding a known volume to excess standard sulfuric acid followed by heating to dispel carbon dioxide and back-titrating with standard sodium hydroxide.

*Example 2*

This example illustrates the substitution of a carboxyl group on the 5-position of a 2,4-oxazolidinedione. The magnesium complex of a 3-phenyl-2,4-oxazolidinedione was prepared by adding 6 g. of 3-phenyl-2,4-oxazolidinedione to 50 ml. of 2 M. magnesium methyl carbonate which had been heated to 80° C. A slow stream of nitrogen was passed over the surface of the stirred reaction mixture. At the end of 30 minutes, the reaction mixture was cooled to room temperature and poured onto a slurry of 30 ml. of hydrochloric acid and 130 g. of ice. A solid separated, which was removed by filtration and washed with ether. The filtrate was extracted 5 times with 75 ml. portions of ether. The ether extracts were combined, dried over anhydrous magnesium sulfate and the ether evaporated under vacuum at room temperature.

The solid, which separated when the reaction mixture was poured into the slurry of hydrochloric acid and ice, was identified as 3-phenyl-5-phenyl-carbamoyl-2,4-oxazolidinedione. Elemental analysis showed that it contained C, 64.7; H, 4.2; N, 9.8; compared to the theoretical values of C, 64.86; H, 4.08; and N, 9.45. It had a molecular weight of 296 compared to the theoretical of 298. The formation of this compound can be accounted for by the fact that the methoxyl ion present in the magnesium methyl carbonate has caused a reverse reaction whereby some of the 3-phenyl-2,4-oxazolidinedione has been converted to glycolic acid and phenyl isocyanate. This phenyl isocyanate has reacted with the magnesium complex of the 3-phenyl-2,4-oxazolidinedione in the same way as illustrated in Example 3.

The product recovered from the evaporation of the ether extracts was dissolved in acetone and then carbon tetrachloride added to the cloud point. On cooling the solution in a refrigerator the product, 3-phenyl-5-carboxy-2,4-oxazolidinedione crystallized. This product had a melting point of 146–149° C. with decomposition. It had a neutralization equivalent of 221 compared to theoretical of 222. Elemental analysis showed that it contained C, 54.2; H, 3.4; N, 6.3; compared to the theoretical of C, 54.30; H, 3.19; N, 6.33.

The substitution of an equivalent amount of the sodium salt of 2,4-oxazolidinedione (i.e., the acidic hydrogen on the nitrogen in the 3-position has been neutralized by sodium hydroxide), for the 3-phenyl-2,4-oxazolidinedione in the above reaction produces 5-carboxy-2,4-oxazolidinedione.

*Example 3*

This example illustrates the substitution of an amide group on the 5-position of a 2,4-oxazolidinedione. A solution of 5.2 g. of 3-phenyl-2,4-oxazolidinedione and 50 ml. of 2 M. magnesium ethyl carbonate was heated under a slow stream of nitrogen at 85° C. for one hour. To this solution 3.5 g. of phenyl isocyanate was added causing the temperature to rise spontaneously to 104° C. After 1.5 hours, the reaction mixture was poured over a slurry of ice and hydrochloric acid. After melting the ice, the product was filtered off and recrystallized from an acetone-water mixture, giving a yield of 5.4 grams. The product, 3 - phenyl - 5-phenylcarbamoyl-2,4-oxazolidinedione was identical with the product obtained in Example 2 as the precipitate from the hydrochloric acid-ice mixture.

When this reaction was repeated, except substituting an equivalent amount of tolyl isocyanate for the phenyl isocyanate, 4.4 g. of 3-phenyl-5-p-tolylcarbamoyl-2,4-oxazolidinedione was obtained. It had a melting point of 207–209° C. and a molecular weight of 313 as compared to theoretical of 310. Elemental analysis showed that it contained C, 65.6; H, 4.5; N, 9.0; compared to theoretical of C, 65.80; H, 4.55; and N, 9.03.

In the same manner, the substitution of the phenyl isocyanate in the above reaction with an equivalent amount of o-nitrophenyl isocyanate produces 3-phenyl-5-o-nitrophenylcarbamoyl - 2,4-oxazolidinedione; p-bromophenyl isocyanate produces 3-phenyl-5-p-bromophenylcarbamoyl-2,4-oxazolidinedione; ethyl isocyanate produces 3-phenyl-5-ethylcarbamoyl-2,4-oxazolidinedione; undecyl isocyanate produces 3-phenyl-5-undecylcarbamoyl-2,4-oxazolidinedione, etc. Likewise the 3-phenyl-2,4-oxazolidine dione may be replaced with an equivalent amount of any other desired 3-substituted-2,4-oxazolidinedione, e.g., 3-ethyl - 2,4-oxazolidinedione, 3-m-nitrophenyl-2,4-oxazolidinedione, 3 - naphthyl-2,4-oxazolidinedione, 3-p-bromophenyl-2,4-oxazolidinedione, etc.

*Example 4*

This example illustrates the substitution of an aralkyl group in the 5-position of a 2,4-oxazolidinedione. A solution of 5 g. of 3-phenyl-2,4-oxazolidinedione and 50 ml. of 2 M. magnesium methyl carbonate was heated at 85° C., under a slow stream of nitrogen for 30 minutes. To this solution 4.0 g. of benzyl chloride was added whereupon the temperature rose spontaneously to 93° C. After 3 hours, the reaction mixture was poured with vigorous stirring onto a slurry of 150 g. of ice and 30 ml. of hydrochloric acid. After the ice was melted, the solution was filtered, yielding 7 g. of 3-phenyl-5-benzyl-2,4-oxazolidinedione. After recrystallization from ethanol, it had a melting point of 150–153° C. Elemental analysis showed that it contained C, 71.5; H, 4.9; N, 5.3, compared to theoretical of C, 71.90; H, 4.90; and N, 5.24.

When the above reaction was repeated, except using an equivalent amount of n-butyl bromide for the benzyl chloride, the product was 3-phenyl-5-n-butyl-2,4-oxazolidinedione, having a melting point of 63–66° C. It was found to have a molecular weight of 225 compared to the theoretical of 233. Elemental analysis showed that it contained C, 66.5; H, 6.2; N, 6.1, compared to the theoretical of C, 66.94; H, 6.48; N, 6.00.

In the same manner, using an equivalent amount of gramine, the Mannich base of indole, for the benzyl chloride, in the above reaction produces 3-phenyl-5-skatyl-2,4-oxazolidinedione.

*Example 5*

This example illustrates the substitution of an ester group on the 5-position of a 2,4-oxazolidinedione. A solution of 4 g. of 3-phenyl-2,4-oxazolidinedione in 50 ml. of 2 M. magnesium methyl carbonate was heated at 80° C. for one hour. After cooling to 50° C., 4 g. of methyl pyrocarbonate was added and the reaction mixture kept at 50° C. for an additional 3 hours. The reaction mixture was hydrolyzed by pouring onto 150 g. of ice and 30 ml. of concentrated hydrochloric acid. After melting of the ice, the solid was removed by filtration and the filtrate extracted with three 75 ml. portions of ether. After drying over anhydrous magnesium sulfate, the ether was removed under vacuum at room temperature and the residue combined with the precipitate and recrystallized from methanol. A yield of 2.8 g. of 3-phenyl-5-methoxycarbonyl-2,4-oxazolidinedione was obtained. It was found to have a molecular weight of 228 compared to the theoretical of 235. Elemental analysis showed that it contained C, 55.6; H, 3.8; N, 5.9, compared to the theoretical of C, 56.17; H, 3.86; and N, 5.95.

*Example 6*

This example shows the substitution of an acyl group on the 5-position of a 2,4-oxazolidinedione. A solution of 4 g. of 3-phenyl-2,4,-oxazolidinedione in 50 ml. of 2 M. magnesium methyl carbonate was heated at 80° C. for one hour. After cooling to 50° C., 6.75 g. of benzoic anhydride was added and the reaction mixture kept at 50° C. for an additional 3 hours. The reaction mixture was poured over a slurry of 150 g. of ice and 30 ml. concentrated hydrochloric acid. The product was filtered from the reaction mixture after the melting of the ice. The filtrate was extracted with three 75 ml. portions of ether. After drying and evaporation of the ether, the residue was combined with the precipitate and recrystallized from carbon tetrachloride. A yield of 2.7 g. of 3 - phenyl-5-benzoyl-2,4,-oxazolidinedione was obtained, having a melting point of 111–114° C. and a molecular weight of 284 compared to the theoretical of 281. Elemental analysis showed that it contained C, 67.7; H, 3.8; N, 5.2, compared to a theoretical of C, 68.32; H, 3.94; and N, 4.98.

The same product, 3-phenyl-5-benzoyl-2,4-oxazolidinedione, is also produced by using an equivalent amount of benzoyl chloride for the benzoic anhydride in the above reaction.

*Example 7*

This example illustrates the hydrolysis of a 2,4-oxazolidinedione to the corresponding α-hydroxy acid. The hydrolysis was carried out in two stages by first hydrolyzing the 2,4-oxazolidinedione to the phenylurethane of the α-hydroxy acid and thereafter hydrolyzing this intermediate to the α-hydroxy acid. This controlled hydrolysis was obtained by using the stoichiometric amount of alkali for the first step, followed by hydrolysis with excess alkali for the second step. This was done to follow the hydrolysis and study the mechanism by which hydrolysis occurred. In practice if the α-hydroxy acid is a desired product, excess alkali may be added at the start to complete the hydrolysis in a single step.

A slurry of 2.4 g. of 3-phenyl-5-benzyl-2,4-oxazolidinedione and 0.8 g. of potassium hydroxide in 50 ml. of water was refluxed for 1.5 hours, by which time the reaction mixture had become a homogeneous solution. The hot solution was acidified with hydrochloric acid and cooled to room temperature, whereupon, the product, α-phenylcarbamoyl hydrocinnamic acid had precipitated. It was filtered off from the solution and recrystallized from a water-ethanol mixture. It had a melting point of 151–153° C. Elemental analysis showed that it contained C, 67.7; H, 5.3; N, 4.8, compared to a theoretical of C, 67.36; H, 5.3; and N, 4.8.

This product, which was the phenylurethane of hydrocinnamic acid, was hydrolyzed to α-hydroxy hydrocinnamic acid by refluxing the above product with excess 1 N sodium hydroxide for 1.5 hours. The reaction mixture was acidified with hydrochloric acid and evaporated to dryness and the solid residue extracted with ether. After drying the ether extract over anhydrous magnesium sulfate, the ether was removed under reduced pressure at room temperature and the product, α-hydroxy hydrocinnamic acid, was recrystallized from a benzene-hexane mixture. The recrystallized product had a melting point of 94–96° C. compared to literature value of 96–97° C. Elemental analysis showed that it contained C, 64.4; H, 6.0, compared to theoretical of C, 65.05; and H, 6.07.

By the same procedure, the products of the other examples may likewise be hydrolyzed to their corresponding α-hydroxy acids.

The 2,4-oxazolidinediones, produced by my process, have the same utility as the known 2,4-oxazolidinediones. They also may be hydrolyzed as illustrated above to the corresponding α-hydroxy acids. These α-hydroxy acids are valuable chemical compounds and may be used for the same purpose as the known α-hydroxy acids. For instance, they may be dehydrated to the corresponding α,β-ethylenically unsaturated acids or may be used in the synthesis of other well known chemical compounds.

The above examples have illustrated many of the modifications and variations of the present invention, but obviously other modifications and variations of the present invention are possible in light of the above teaching. Therefore, it is to be understood that changes and variations may be made in the particular embodiments of the invention described which are within the full intended scope of the invention as defined by the appended claims.

What I claim as new and desire to secure by Letters Patent of the United States is:

1. The magnesium chelate of a 5-carboxy-2,4-oxazolidinedione having a substituent in the 3-position which is selected from the group consisting of alkali metals, alkaline earth metals, monovalent and divalent aliphatic groups having no more than 30 carbon atoms and monovalent and divalent aromatic groups having no more than 30 carbon atoms with the proviso that said divalent aliphatic and divalent aromatic groups are bridging groups joining two separate moieties of said magnesium chelate through the nitrogen atom in the 3-position of each moiety.

2. The magnetism chelate of a 3-aryl-5-carboxy-2,4-oxazolidinedione wherein the aryl group has no more than 30 carbon atoms.

3. The magnesium chelate of a 3-alkyl-5-carboxy-2,4-oxazolidinedione wherein the alkyl group has no more than 30 carbon atoms.

4. The magnesium chelate of 5-carboxy-2,4-oxazolidinedione wherein the hydrogen in the 3-position has been replaced with a metal selected from the group consisting of alkali metals and alkaline earth metals.

5. A 2,4-oxazolidinedione having the formula,

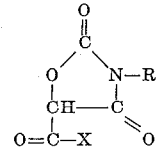

where R is selected from the group consisting of hydrogen and hydrocarbyl having no more than 30 carbon atoms and X is selected from the group consisting of —OR where R is as defined above —NHR′ where R′ is hydrocarbyl having no more than 30 carbon atoms.

6. A 3 - aryl - 5 - alkoxycarbonyl-2,4-oxazolidinedione wherein the aryl and alkoxy groups have no more than 30 carbon atoms in each group.

7. A 3 - alkyl - 5-alkoxycarbonyl-2,4-oxazolidinedione wherein the alkyl and alkoxy groups have no more than 30 carbon atoms in each group.

8. A 3 - alkyl - 5-alkylcrabamoyl-2,4-oxazolidinedione wherein each alkyl group has no more than 30 carbon atoms.

9. A 3 - alkyl - 5 - arylcarbamoyl-2,4-oxazolidinedione wherein the alkyl and aryl groups have no more than 30 carbon atoms in each group.

10. A 3-aryl-5-alkyloxycarbamoyl-2,4-oxazolidinedione wherein the aryl and alkyl groups have no more than 30 carbon atoms in each group.

11. A 3-aryl-5-aryloxycarbamoyl-2,4-oxazolidinedione wherein each aryl group has no more than 30 carbon atoms.

References Cited by the Examiner

Finkbeiner: J. Am. Chem. Soc., vol. 86 (March 1964), pages 961–2.

Stiles: J. Am. Chem. Soc., volume 81, pages 2598, 2599 (1959).

References Cited by the Applicant

Chem. Rev. 58, 63 (1958).

J. Am. Chem. Soc. 67, 522 (1945).

ALEX MAZEL, *Primary Examiner.*

HENRY R. JILES, *Examiner.*

RICHARD J. GALLAGHER, *Assistant Examiner.*

UNITED STATES PATENT OFFICE
CERTIFICATE OF CORRECTION

Patent No. 3,280,136            October 18, 1966

Herman Lawrence Finkbeiner

It is hereby certified that error appears in the above numbered patent requiring correction and that the said Letters Patent should read as corrected below.

Column 1, line 55, the left-hand portion of the formula should appear as shown below instead of as in the patent:

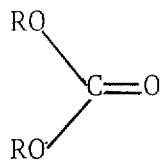

column 4, line 35, the formula should appear as shown below instead of as in the patent:

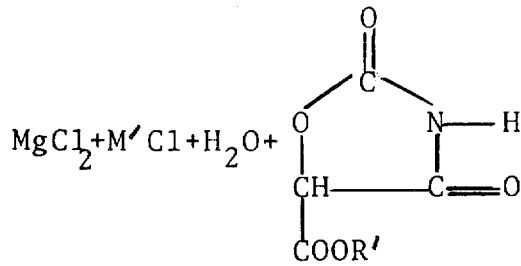

line 45, the second formula should appear as shown below instead of as in the patent:

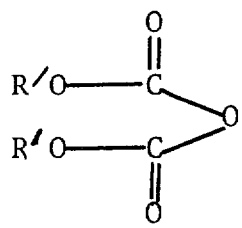

3,280,136 column 9, line 50, for "unsautrated" read -- unsaturated --; column 16, line 6, for "magnetism" read -- magnesium --; line 27, after "above" insert -- and --; line 36, for "alkyl-crabamoyl" read -- alkylcarbamoyl --.

Signed and sealed this 12th day of September 1967.

(SEAL)
Attest:

ERNEST W. SWIDER
Attesting Officer

EDWARD J. BRENNER
Commissioner of Patents